United States Patent [19]
Grundy

[11] 3,828,225
[45] Aug. 6, 1974

[54] FAIL-SAFE VEHICLE-CARRIED ANTI-COLLISION PROTECTION RECEIVER

[75] Inventor: Reed H. Grundy, Murrysville, Pa.

[73] Assignee: Westinghouse Air Brake Company, Swissvale, Pa.

[22] Filed: Sept. 18, 1972

[21] Appl. No.: 289,768

[52] U.S. Cl............ 317/147, 246/63 C, 246/182 B
[51] Int. Cl. ......................................... H01h 47/20
[58] Field of Search........... 246/182 B, 187 B, 29 R, 246/34 CT, 63 R, 63 C; 340/147 CN, 147 F, 171 R, 171 A; 317/146, 147

[56] References Cited
UNITED STATES PATENTS

| | | | |
|---|---|---|---|
| 1,322,566 | 11/1919 | Hettinger | 340/171 A |
| 1,365,329 | 1/1921 | Lewis | 317/147 |
| 1,869,847 | 8/1932 | Grendahl | 340/147 F |
| 2,500,212 | 3/1950 | Starr | 317/147 |
| 2,954,545 | 9/1960 | Drake | 340/171 R |
| 2,975,272 | 3/1961 | Renick et al. | 317/147 |
| 3,233,152 | 2/1966 | Druz | 317/147 |
| 3,552,692 | 1/1971 | Horeczky | 246/187 B |

FOREIGN PATENTS OR APPLICATIONS

| | | | |
|---|---|---|---|
| 1,066,355 | 4/1967 | Great Britain | 246/34 CT |

Primary Examiner—J. D. Miller
Assistant Examiner—Harry E. Moose, Jr.
Attorney, Agent, or Firm—J. B. Sotak; H. A. Williamson

[57] ABSTRACT

This disclosure relates to a fail-safe vehicle-carried anti-collision receiver for automatically applying and releasing the service brakes to control the movement of a vehicle. The receiver includes an electromagnetic inductive coil for normally picking up two a.c. signals from the wayside as the vehicle moves along its route of travel. The a.c. signals are amplified by a preamplifier and are individually transformer coupled to a pair of signal frequency responsive circuits each of which includes an amplifier and a rectifier. Each of the rectified d.c. output signals of the signal frequency responsive circuits is coupled to a separate input of an amplitude level detecting and logic circuit. The detecting and logic circuit produces a.c. oscillations which are amplified and rectified by a relay driving circuit. The rectified output of the relay driving circuit normally energizes a vital relay which maintains its back contacts open to deactivate the service brake control apparatus when and only when the presence and level of both of the d.c. input signals to the detecting and logic circuit are produced due to the reception of the two a.c. input signals.

10 Claims, 1 Drawing Figure

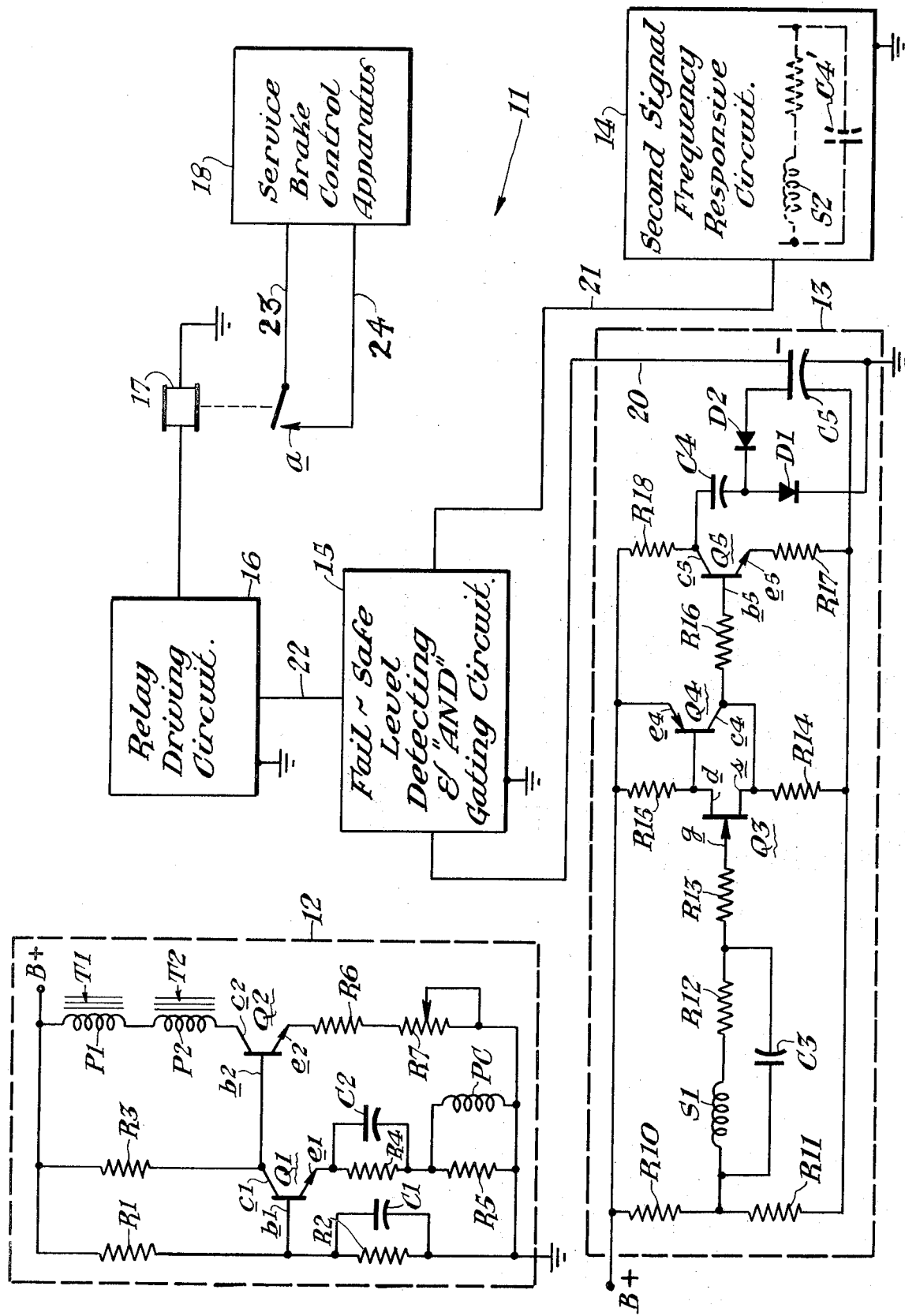

FAIL-SAFE VEHICLE-CARRIED ANTI-COLLISION PROTECTION RECEIVER

This invention relates to a novel vital receiver for vehicle anti-collision control equipment and, more particularly, to a fail-safe vehicle-carried separation circuit for controlling the movement of overhauling vehicles by requiring the onboard reception of at least two pickup signals from the pathway along which the vehicle travels in order to prevent the application of the service brakes of the overhauling vehicle.

In certain signal and control systems for railroad, monorail, highway, and other mass and/or rapid transit operations, it is mandatory that each critical component and circuit of the system is required to operate in a fail-safe fashion. That is, the electrical equipment must be carefully examined and designed in such a manner that any foreseeable failure will result in a safe condition. For example, in any vital vehicular anti-collision control system, it is essential that the brakes of an overtaking or overhauling vehicle must be applied a safe distance in advance of the rear end of a leading vehicle. Various types of rear end protection systems are now available and in operation on railroads and subways. However, the previously proposed arrangements are somewhat complicated and relatively expensive to manufacture and maintain. It has been found that a more effective and relatively inexpensive rear end protection arrangement may be achieved by employing a version of a block or section approach which is sometimes used in cab signaling systems. However, in the present instance only a proceed or stop command is employed since a motorman is normally responsible for manually controlling the speed of the vehicle or train. In actual practice, the presently described rear end protection system has been developed for a monorail which has vehicles traveling along a concrete pathway or roadway. The system employs an overlapping signaling arrangement in which two separate and distinct signal frequencies are coupled to and along the length of the pathway. The two frequencies are generated by a plurality of wayside transmitters which are displaced along the pathway. That is, each wayside transmitter is connected in staggered relationship to the d.c. propulsion voltage carrying conductors which feed electrical power to the monorail vehicles. It will be appreciated that the space between the adjacent wayside transmitters must be greater than the safe braking distance that is required to stop a vehicle moving at maximum speed. The two different signal frequencies are normally picked up by the vehicles by an inductor pickup device which is located in advance of the front axle of the vehicles. The inductive pickup device is coupled to the input of a car-carried receiver which senses the presence or absence of the two signal frequencies. The reception of both of the signal frequencies maintains a vital relay in its energized position which signifies that the pathway ahead is clear of any vehicle which could cause a rear end collision. However, when either one or both of the frequencies is not being picked up onboard the vehicle from the pathway, the receiver deenergizes the vital relay which, in turn, operates the service brakes to stop the overhauling vehicle a safe distance before the leading vehicle.

Accordingly, it is an object of this invention to provide a new and improved vehicle-carried receiver for use in an anti-collision control equipment.

A further object of this invention is to provide a vital receiver which senses the presence of at least two separate signal frequencies and, in addition to which, the value of said signal frequencies must be greater than some preset vital minimum level.

Another object of this invention is to provide a vehicle-carried receiver which operates in a fail-safe manner.

Yet another object of this invention is to provide a fail-safe receiver for energizing a vital service brake controlling relay when two signal frequencies are being received onboard a vehicle.

Still another object of this invention is to provide a vital vehicle separation receiver onboard a trailing monorail vehicle to prevent a collision with a leading monorail vehicle.

Yet a further object of this invention is to provide a fail-safe anti-collision receiver which requires the reception of two distinct signal frequencies to prevent the application of the service brakes of a monorail vehicle.

Still a further object of this invention is to provide a fail-safe train separation receiver which causes the application of the service brakes during the absence of either one or both of a pair of different signal frequencies.

An additional object of this invention is to provide a unique car-carried receiver which picks up a pair of two distinct signals from the wayside to operate a single vital electromagnetic relay or a plurality of vital electromagnetic relays.

Also, it is an object of this invention to provide a fail-safe multifrequency responsive receiver which is economical in cost, simple in design, and efficient and reliable in operation.

In accordance with the present invention, the vital vehicle-carried receiver includes an inductive pickup coil mounted forward of the front axle of the monorail vehicle for normally receiving two signals from a pathway when a leading vehicle is a given safe distance in front of a trailing vehicle. The two signals have different frequencies and are inductively coupled to a pickup coil which is connected to the input of a multistage transistor preamplifier. The output of the preamplifier is connected to the primary windings of a pair of transformers. The pick-up signals are transformer coupled to a pair of secondary windings each of which is individually tuned to one of the two distinct or different frequencies. Each of the secondary windings is connected to the input of two separate multistage transistor amplifiers. The output of each of the transistor amplifiers is applied to a d.c. voltage doubling circuit which produces a polarity of voltage opposite to the normal d.c. operating potential that is supplied to each of the transistor amplifiers. The rectified voltage from each of the voltage doubling circuits is applied to a vital amplitude level detecting and "AND" logic gating circuit. The detecting and gating circuit is a twin-tee feedback type of multistage transistor amplifier in which a pair of voltage breakdown devices only permit a.c. oscillations to be produced when both of the d.c. voltages from the two voltage doubling circuits are above the threshold value of the two breakdown devices. The a.c. oscillations from the detecting and gating circuit are amplified and, in turn, are applied to another d.c. voltage doubling circuit which inverts the polarity of its d.c. output voltage with respect to its normal d.c. supply voltage. The inverted d.c. voltage is applied to the coil of a vital type of electromagnetic relay which has a back contact for controlling the service brakes of the monorail vehicle. Thus, when there is no vehicle within the prescribed safe braking distance of the oncoming vehicle, both frequencies are received onboard and the vital relay is energized and the back contact is opened. However, when a leading vehicle shunts one of the two signal frequencies, the receiver onboard the trailing vehicle will immediately cause the vital relay to become deenergized, thereby closing its back contact so that the service brakes are applied and the trailing vehicle is safely stopped well in advance of the rear end of the leading vehicle.

The foregoing objects and other attendant features and advantages will be more readily appreciated as the subject invention becomes better understood by reference to the detailed description when considered in conjunction with the single FIGURE of the accompanying drawing wherein:

The single FIGURE is partly a schematic circuit and partly a block diagram of the vital type of solid-state vehicle-carried separation receiver in accordance with the teachings of the present invention.

As shown, the vital or fail-safe electronic vehicle separation receiver, generally characterized by numeral 11, includes a signal pickup circuit 12, a first signal frequency responsive circuit 13, a second signal frequency responsive circuit 14, a fail-safe amplitude level detecting and "AND" gating logic circuit 15, a relay driving circuit 16, a vital relay 17, and service brake controlling apparatus 18.

The signal pickup circuit 12 includes an inductive pickup device or coil PC which is suitably mechanically mounted forward of the front axle of the monorail vehicle so that a.c. signals from the pathway or monorail beam are inductively coupled to the coil. In practice two separate or different signal frequencies are transmitted through the power buses or conductors which supply electrical energy to the propulsion motors on the monorail vehicles. The transmitters are connected to the conductors in a staggered or overlaid relationship in that the transmitter generating one frequency is located at a point where the signal of the other frequency transmitter terminates and vice versa. Thus, the transmitters of the two signal frequencies are alternately disposed along the entire length of the pathway to form block sections. The distance between adjacent transmitter connecting points should be equal to or slightly greater than the maximum safe braking distance which is necessary to safely bring a vehicle to a complete stop.

As shown, the pickup circuit 12 includes a multistage amplifier composed of a first input stage having an NPN transistor Q1 and a second output stage having an NPN transistor Q2. The input amplifier stage including transistor Q1 is connected in a common base configuration in order to exhibit a relatively low impedance for the pickup coil PC. The transistor Q1 includes an emitter electrode $e_1$, a collector electrode $c_1$, and a base electrode $b_1$. As shown, a voltage divider including resistors R1 and R2 is connected across a suitable d.c. supply voltage (not shown). That is, the upper end of resistor R1 is connected to the B+ terminal of the d.c. supply source while the lower end of resistor R2 is connected to a reference point, such as, ground. The base electrode $b_1$ is suitably biased by being connected to the junction of resistors R1 and R2. The collector electrode $c_1$ is connected to the B+ terminal via resistor R3 while the emitter electrode $e_1$ is connected to ground via series connected resistors R4 and R5. Bypass capacitors C1 and C2 are connected across resistors R2 and R4, respectively. The capacitors result in a very low a.c. impedance value while the resistor R4 provides d.c. degeneration which stabilizes the d.c. operating point. It will be appreciated that capacitors C1 and C2 are chosen to bypass the two selected signal frequencies but that each of the capacitors is of a low enough value to reject 60 Hz and its low harmonics, but their impedance is such that it does not bypass effectively at these lower frequencies.

As shown, the inductive pickup coil PC is effectively connected across resistor R5. It will be appreciated that the current of the two signal frequencies induced in the pickup coil PC will cause the greatest amount of voltage to be developed across resistor R3 due to its relatively high impedance value in comparison to the resistances R4 and R5 and the reactance 1/WC2. It will be noted that the output amplifier stage is connected in a common emitter configuration in order to effectively transform the voltage developed across resistor R3 into a current. The transistor Q2 includes an emitter electrode $e_2$, a collector electrode $c_2$, and a base electrode $b_2$, the latter being directly connected to collector electrode $c_1$. The collector electrode $c_2$ is connected to the B+ terminal via a pair of series connected primary windings P1 and P2 of transformers T1 and T2, respectively. The emitter electrode $e_2$ is connected to ground via a series connected resistor R6 and adjustable resistor or potentiometer R7. It will be appreciated that the current gain produced by the two stage amplifier including transistors Q1 and Q2 in the primary windings P1 and P2 is effectively I (picked up) X R3/R6 + R7.

It will be noted the transformer T1 includes a secondary winding S1 which is inductively coupled to the primary winding P1. The secondary winding S1 forms the input to the first signal frequency responsive circuit 13. It will also be noted that the transformer T2 includes a secondary winding S2 shown by the dashed lines in the second signal frequency responsive circuit 14 which forms the input thereto, since both circuit 13 and circuit 14 are identical except that one circuit is tuned to one frequency while the other circuit is tuned to another frequency. Therefore, for the purpose of convenience only the details of circuit 13 will be described at this time. Like circuit 12, the first signal frequency responsive circuit 13 is connected across the B+ terminal and ground of the supply source. For example, a voltage divider including resistors R10 and R11 is connected across terminal B+ and a ground. As shown, one end of the secondary winding S1 is connected to the junction of resistors R10 and R11 while the other end of the secondary winding S1 is connected to a relatively low value resistor R12. The resistor R12 increases the bandwidth of the frequency response by lowering the Q of the circuit. A tuning capacitor C3 is connected in parallel with the series connected winding S1 and resistor R12. The tuned circuit is connected to the input of a multistage amplifier network including transistors Q3, Q4, and Q5. The first stage includes a field-effect transistor having a gate electrode $g$, a source electrode $s$, and a drain electrode $d$. The tuned circuit is connected to the gate electrode $g$ of the field effect transistor Q3 via resistor R13. The source electrode s of transistor Q3 is connected to ground via resistor R14 while the drain electrode d of transistor Q3 is connected to the B+ terminal via resistor R15. The PNP transistor Q4 includes an emitter electrode e4, a collector electrode c4, and a base electrode b4 which are directly connected to the drain electrode d. The emitter electrode e4 is directly connected to the B+ terminal, and the collector electrode c4, which is the output to the output stage, is also directly connected to the source electrode s. The impedance of the tuned circuit is very high at resonance frequency and therefore the input to the amplifier should be very high for matching purposes. A very high input impedance is realized since the collector c4 is directly connected to the source s which results in a voltage follower connection and a bootstrapping feedback action. The high input impedance results in a wider signal amplitude range with a substantially fixed Q because the value of resistor R13 is relatively large and thereby allows the induced signals in the tuned circuit to swing through higher levels of peak values. The purpose of providing high levels of signal swing at the output of the tuned circuit is to allow the wayside transmitters to have a wide dynamic range. Thus, the secondary winding S1 is capable of operating at a wide range of voltage levels. In view of this factor, the secondary winding S1 and capacitor C3 cause the broadening of Q only at very high levels of input current. As shown, the output stage includes the NPN transistor Q5 having an emitter electrode e5, a collector electrode c5, and a base electrode b5. The base electrode b5 is connected to the collector electrode c4 via resistor R16. The emitter electrode e5 is connected to ground by resistor R17 while the collector electrode c5 is connected to the B+ terminal via resistor R 18. The output of the amplifying transistor Q5 is coupled to a voltage doubler or d.c. rectifying network which includes capacitors C4 and C5 and diodes D1 and D2. The collector electrode c5 is connected by capacitor C4 to the junction point of the anode of diode D1 and the cathode of diode D2. The cathode of diode D1 is connected to ground while the anode of diode D2 is connected to the upper plate of capacitor C5 which, in this case, is preferably a four-terminal capacitor. The lower plate of the four-terminal capacitor C5 is connected to ground. Thus, under normal conditions a first d.c. output voltage is derived across conductor 20 and ground from circuit 13, namely, from the upper and lower plates of capacitor C5.

As mentioned above, the second signal frequency responsive circuit 14 is substantially identical to circuit 13 except that capacitor $C4^1$ (in lieu of C3) tunes circuit 14 to the second of the transmitter frequencies that is also picked up by the inductive coil PC. Similarly, a second d.c. output voltage is derived across conductor 21 and ground of circuit 14.

As shown, the conductors 20 and 21 are connected to the vital amplitude level detecting and "AND" gating logic circuit 15. The circuit 15 may be of the type shown and disclosed in my copending application for Letters Patent of the United States, Ser. No. 258,879, filed June 1, 1972, for A Combination Vital Level Detector And "AND" Gate, which is assigned to the assignee of the present invention.

Briefly, the vital solid-state level detecting and "AND" gating circuit employs a multistage feedback transistor amplifier, a phase-shift R-C twin-tee network, and a pair of shunt type voltage regulators. The multistage feedback transistor amplifier includes a common-collector input stage and a common-emitter output stage. One leg formed by a first resistor and a first capacitor of the R-C twin-tee network is connected to the collector electrode of the common-emitter output stage. A second leg formed by a second resistor and a second capacitor of the R-C twin-tee network is connected to the base electrode of the common-collector input stage. A common third leg of the R-C twin-tee network is formed by a third resistor and a third capacitor. Each of the shunt voltage regulators includes a current limiting resistor and a Zener diode connected across individual d.c. inputs. One of the pair of Zener diodes is connected in series with the third capacitor of the R-C twin-tee network while the other of the pair of Zener diodes is connected in series with the third resistor of the R-C twin-tee network. Since a Zener diode exhibits a high impedance when it is nonconducting, there is an insufficient amount of regenerative feedback at any frequency to sustain oscillations when the d.c. input potentials do not exceed the threshold value of the Zener diode. However, when the value of the d.c. input potentials exceeds the threshold values of the Zener diodes, they break down and become conductive. The conduction of the Zener diodes is accompanied by a sudden reduction in the impedance value in the common capacitive and resistive arms or legs of the twin-tee network. The reduced impedance causes a dramatic increase in the amount of regeneration at a predetermined center frequency. Thus, the multistage amplifier produces an output so that a.c. signals or oscillations will be available on the output terminals when and only when both of the d.c. input potentials exceed the predetermined threshold value. In viewing the single FIGURE drawing of application Ser. No. 258,879, the terminals 18 and 19 shown therein would provide the connecting points for the above-mentioned conductors 20 and 21 which would normally supply the necessary d.c. input voltages from circuits 13 and 14, respectively.

As shown, the circuit 15 is connected to the relay driving circuit via conductor 22. Again viewing the single FIGURE of application Ser. No. 258,879, the terminal 16 would provide a convenient point of connection for conductor 22. The relay driving circuit 16 may be of the type shown and disclosed in U.S. Pat. No. 3,553,488, issued Jan. 5, 1971, to John O. G. Darrow and Raymond C. Franke, for A Fail-Safe Circuit Arrangement, namely, the circuits encompassed by the dashed blocks 4, 6, and 7 of the patent. However, it is understood that other types of relay driving circuits may be used in practicing the present invention. Generally, circuit 16 requires at least an input amplifier gain stage and an output amplifier stage feeding rectifier network, such as, a d.c. voltage doubler as shown by dashed blocks 4, 6, and 7 of the patent as noted above.

It will be noted that the output from the relay driving circuit 16 is connected to the coil of the vital type of electromagnetic relay 17. The relay 17 operates in a fail-safe manner and includes at least one contact, such as, a back contact a which controls the service brake control apparatus 18, as will be described hereinafter.

In describing the operation, it will be initially assumed that the route ahead of the oncoming moving monorail vehicle is not impeded by the presence of a leading monorail vehicle. That is, both signal frequencies are received by the receiver 11 in that neither signal is shunted by a preceding vehicle. The reception of both of the signals is amplified by transistors Q1 and Q2 and a.c. voltage signals are developed in the primary windings P1 and P2 of transformers T1 and T2, respectively. The primary winding P1 induces an a.c. signal of a first frequency into the secondary winding S1 to which it is tuned, and the primary winding P2 induces an a.c. signal of a second frequency into the secondary winding S2 to which it is tuned. The resonant frequency induced in secondary winding S1 is applied to the gate $g$ of the field effect transistor Q3. The signal appearing on the drain electrode $d$ is amplified by the transistor Q4 and, in turn, is applied to the input of transistor Q5. The a.c. output signal is derived from the collector electrode $c5$ and is rectified and doubled by diodes D1, D2 and capacitors C4, C5. It will be noted that the polarity of the voltage developed across capacitor C5 is opposite to the polarity of the B+ supply potential. The change in polarity of the required d.c. output voltage ensures that a leakage path from the B+ supply terminal to conductor 20 cannot simulate a valid d.c. output signal on conductor 20. In a similar manner, the resonant frequency to which the secondary winding S2 is tuned is amplified and rectified by the second frequency responsive circuit 14. Thus, a negative d.c. output voltage will also appear on conductor 21 when an a.c. input signal having the second frequency is picked up by the coil PC of the vehicle-carried receiver 11. As previously mentioned, the d.c. voltages appearing on input conductors 20 and 21 are applied to the fail-safe vital circuit 15 and, in fact, are employed to break down and render the respective Zener diodes conductive, as described in my copending application Ser. No. 258,879. As explained, the conduction of both of the Zener diodes is an amplitude level detecting and a logic coincidence or "AND" circuit which results in the energization of the solid-state oscillator of circuit 15. Thus, a.c. oscillations are generated by circuit 15 and are derived from conductor 22. The a.c. input to the relay drive circuit is initially amplified by the multistage transistor amplifier and subsequently rectified and doubled by the d.c. voltage doubling circuit, as described in the above-mentioned U.S. Pat. No. 3,553,488. The d.c. output voltage of circuit 16 energizes the coil of the vital electromagnetic relay 17 so that its armature is picked up which opens its back contact $a$. Thus, the electrical circuit of the service brake control apparatus is interrupted so that it is not possible for the vehicle-carried receiver to initiate an automatic service braking to bring the moving vehicle to a stop. Hence, the reception of the two-frequency signal onboard the vehicle allows the motorman to proceed in a normal manner along his route of travel without any danger of a rear end collision with a preceding vehicle.

Now let us assume that either a stopped or a slower moving vehicle is on the trackway ahead of an oncoming vehicle. At some point in time, the closing distance between the trailing vehicle and the leading vehicle will result in the loss of one of the frequency signals. That is, the leading vehicle or train will shunt out one of the a.c. transmitter signals when the most forward one of the two alternate transmitting connection locations between successive vehicles is reached. Thus, only one a.c. signal will be induced into the pickup coil PC of the receiver 11 when the distance between two successive vehicles is less than the distance between two alternate transmitter locations. For the purpose of convenience, it will be assumed that the signal which is normally applied to the secondary winding S1 of transformer T1 is not being presently picked up by the inductive coil PC. However, it will be appreciated that either one of the two transmitter signals may be shunted by the leading vehicle dependent upon the location. The lack of a.c. signals at the gate electrode $g$ of transistor Q3 results in the absence of any a.c. voltage at the collector electrodes $c4$ and $c5$ of transistors Q4 and Q5, respectively. Thus, no rectification takes place and no d.c. voltage will appear on conductor 20. The absence of the d.c. voltage results in the nonconduction of the Zener diode to which conductor 20 is coupled in circuit 15. Thus, the necessary coincidence or "AND" function is destroyed and circuit 15 is incapable of producing a.c. oscillations even though the required level of d.c. voltage is available on conductor 21 due to the reception of the other a.c. transmitter signal. Accordingly, circuit 15 is unable to produce any a.c. voltage signals on conductor 22. Therefore, no d.c. voltage is supplied to the coil of the vital relay 17 by the relay driving circuit 16. Relay 17 becomes deenergized, releasing its armature and closing back contact $a$. As shown, the closing of the back contact $a$ completes the electrical circuit to the service brake control apparatus which immediately causes the automatic application of the service brakes of the vehicle. However, in a normal vital railroad operation a front contact of the vital relay 17 would be closed so that the energization of the emergency brake release mechanism would result. Thus, any interruption in the circuit, such as, a breakage of lead 23 or 24 would cause immediate application of the emergency braking apparatus. Thus, the trailing vehicle will safely stop well in advance of a standing leading vehicle, thereby avoiding any chance of a collision. The trailing vehicle will be allowed to proceed to normal running operation when the leading vehicle no longer shunts out the one a.c. signal. Thus, the receiver 11 will again receive both of the necessary a.c. signals so that the service brake control apparatus 18 will be deactivated to cause the energization of the relay 17 and the opening of its back contact $a$.

It will be appreciated that the receiver 11 functions in a similar fashion when the trailing vehicle approaches a slower moving leading vehicle except that a modulating effect or an OFF-ON operation takes place since the service brakes are periodically applied and released as the distance between the vehicles changes. That is, when the leading vehicle shunts out one of the a.c. signals, the service brakes of the trailing vehicle are applied to attempt to stop it; however, when the speed of the trailing vehicle becomes less than that of the leading vehicle the distance between the vehicles may increase to a point when the leading vehicle no longer shunts out any one of the a.c. signals. Thus, the service brakes of the trailing vehicle will be released until another shunt is caused by the leading vehicle.

As previously mentioned, the car-carried receiver 11 is a vital or fail-safe circuit in that any critical circuit or component failure will result in the application of the service brakes of the vehicle. For instance, any critical open or short circuit condition will result in the loss of either one or both of the a.c. signals which in effect simulates a mode of operation identical to the shunting action of a leading vehicle. Thus, any critical or circuit failure will result in a more restrictive or safe condition, namely, the vehicle will be smoothly and safely stopped by the automatic application of its service brakes. This positive anti-collision protection is provided in that under no circumstance can a trailing vehicle collide with the rear end of a leading vehicle.

It will be appreciated that while the present invention finds particular utility in an anti-collision protection arrangement for monorail or railroad vehicles, it is understood that the disclosed vital receiver may be used in various other applications which require the safety and security inherently present in this invention. But regardless of the manner in which the invention is used, it is understood that various alterations may be made by persons skilled in the art without departing from the spirit and scope of this invention. It is also apparent that other modifications and changes can be made to the presently described invention and, therefore, it will be appreciated that all changes, equivalents, and modifications within the spirit and scope of the present invention are herein meant to be included in the appended claims.

Having thus described my invention, what I claim is:

1. A vital circuit for receiving at least two a.c. signals each having a different frequency comprising, a pickup device, a preamplifier having an input coupled to said pickup device, a pair of transformers having their primary windings coupled to the output of said preamplifier, the secondary windings of said transformers coupled to the input of separate amplifiers, the output of each of said amplifiers coupled to the inputs of separate rectifiers, the output of the rectifiers coupled to the biasing supply terminals of a fail-safe level detector and logic circuit, the output of said fail-safe level detector and logic circuit coupled to the input of an amplifier-rectifier, and the output of said amplifier-rectifier coupled to a relay which functions when and only when said pickup device receives the two frequency signals.

2. A vital circuit as defined in claim 1, wherein the primary windings of said transformers are connected in series relationship.

3. A vital circuit as defined in claim 1, wherein the secondary windings of said transformers are tuned to each of the different frequencies by a tuning capacitor.

4. A vital circuit as defined in claim 3, wherein said secondary windings and said capacitors are each a parallel tuned network.

5. A vital circuit as defined in claim 1, wherein said pickup device is an inductive coil.

6. A vital circuit as defined in claim 1, wherein said separate rectifiers each take the form of a d.c. voltage doubling network.

7. A vital circuit as defined in claim 1, wherein said amplifiers include a multistage transistor amplifying network.

8. A vital circuit as defined in claim 1, wherein said relay includes a back contact which controls the brakes of a vehicle.

9. A vital circuit as defined in claim 1, wherein said preamplifier includes a multistage transistor amplifying network.

10. A fail-safe anti-collision receiver for automatically controlling the movement of an overhauling vehicle by applying and releasing the service brakes comprising, a pickup coil inductively coupled with the roadway along which the vehicles move, a transistor preamplifying circuit having an input and an output, said pickup coil coupled to the input of said preamplifying circuit, a pair of transformers each having a primary and a secondary winding, said primary windings of each of said transformers coupled to the output of said preamplifying circuit, each of said secondary windings tuned to two different frequencies, a pair of signal frequency responsive circuits, each of said signal frequency responsive circuits including one of the secondary windings, a multistage transistor amplifying circuit and a d.c. voltage doubling network, the output of each of said d.c. voltage doubling networks coupled to separate inputs of a fail-safe amplitude level detecting and "AND" gating circuit, the output of said fail-safe amplitude level detecting and "AND" gating circuit coupled to the input of a relay driving circuit, the output of the relay driving circuit coupled to the coil of a vital electromagnetic relay, said vital electromagnetic relay includes a back contact which controls the service brake control apparatus of the vehicle.

* * * * *